United States Patent
McKeever et al.

(10) Patent No.: US 9,200,960 B2
(45) Date of Patent: Dec. 1, 2015

(54) CAVITY ENHANCED ABSORPTION SPECTROSCOPY WITH A LASER MODULATION SIDE-BAND FREQUENCY LOCKED TO THE CAVITY

(71) Applicant: ENTANGLEMENT TECHNOLOGIES, INC., Burlingame, CA (US)

(72) Inventors: Jason McKeever, San Francisco, CA (US); Anthony Edward Miller, San Francisco, CA (US)

(73) Assignee: ENTANGLEMENT TECHNOLOGIES, INC., Burlingame, CA (US)

( * ) Notice: Subject to any disclaimer, the term of this patent is extended or adjusted under 35 U.S.C. 154(b) by 288 days.

(21) Appl. No.: 13/871,421

(22) Filed: Apr. 26, 2013

(65) Prior Publication Data

US 2014/0320856 A1 Oct. 30, 2014

(51) Int. Cl.
*G01J 3/02* (2006.01)
*G01J 3/433* (2006.01)

(52) U.S. Cl.
CPC .............. *G01J 3/4338* (2013.01); *G01J 3/0237* (2013.01)

(58) Field of Classification Search
USPC ............. 356/432–437, 326; 250/339.13, 434, 250/437
See application file for complete search history.

(56) References Cited

U.S. PATENT DOCUMENTS

| | | | | |
|---|---|---|---|---|
| 5,548,217 A * | 8/1996 | Gibson et al. | ................. | 324/316 |
| 6,201,638 B1 * | 3/2001 | Hall et al. | ..................... | 359/346 |
| 8,327,686 B2 * | 12/2012 | Kachanov et al. | ........... | 73/24.02 |
| 2004/0065816 A1 * | 4/2004 | Ye et al. | .................... | 250/227.18 |
| 2006/0181710 A1 * | 8/2006 | Kachanov et al. | ............. | 356/437 |
| 2007/0195317 A1 * | 8/2007 | Schottner et al. | .......... | 356/239.2 |
| 2008/0255769 A1 * | 10/2008 | Zhou et al. | ....................... | 702/24 |
| 2008/0285606 A1 * | 11/2008 | Kippenberg et al. | ........... | 372/32 |
| 2010/0315642 A1 * | 12/2010 | Chow et al. | ................... | 356/432 |
| 2011/0295140 A1 * | 12/2011 | Zaidi et al. | .................... | 600/532 |
| 2013/0228688 A1 * | 9/2013 | Plusquellic et al. | ..... | 250/339.06 |

OTHER PUBLICATIONS

O'Keefe, Anthony et al.; "cw Integrated cavity output spectroscopy"; Elsevier Chemical Physics Letters 307 (1999); Jul. 9, 1999; pp. 343-349.

Drever, R.W.P. et al.; "Laser Phase and Frequency Stabilization Using an Optical Resonator"; Appl. Phys. B 31, 1983; pp. 97-105.

(Continued)

*Primary Examiner* — Sang Nguyen
(74) *Attorney, Agent, or Firm* — Rankin, Hill & Clark LLP

(57) ABSTRACT

A cavity enhanced absorption spectrometer (CEAS) and method for controlling the same. The CEAS includes a coherent electro-magnetic radiation source, an electro-magnetic modulator that creates a sideband with an adjustable frequency that is offset from the radiation source frequency by imparting an adjustable frequency modulation to the radiation. The CEAS also includes a RF source that drives the electro-magnetic modulator and a cavity enhanced absorption resonator (CEAR) that receives the sideband. A detector measures the proximity of the frequency of the sideband relative to the resonant frequency of the CEAR and generates a proximity detector signal, which is converted by a controller to a control signal that controls at least one of the RF source and the resonant frequency of the CEAR such that the frequency of the sideband and the resonant frequency of the CEAR are adjusted to maintain a predetermined proximity therebetween.

23 Claims, 4 Drawing Sheets

(56) References Cited

OTHER PUBLICATIONS

Shaddock, D.A. et al.; "Frequency locking a laser to an optical cavity by use of spatial mode interference"; Optics Letters, Nov. 1, 1999; vol. 24, No. 21; pp. 1499-1501.

Black, Eric D.; "An introduction to Pound-Drever-Hall laser frequency stabilization"; Am. J. Phys. 69 (1); Jan. 2001; pp. 79-87.

Long, R. et al.; "Multiple frequency modulation for low-light atom measurements in an optical cavity"; Optics Letters; Sep. 1, 2007; vol. 32, No. 17; pp. 2502-2504.

Hansch, T.W. et al.; "Laser Frequency Stabilitzation by Polarization Spectroscopy of a Reflecting Reference Cavity"; Optics Communications; Dec. 1980; vol. 35, No. 3; pp. 441-444.

\* cited by examiner

CAVITY ENHANCED ABSORPTION SPECTROSCOPY WITH A LASER MODULATION SIDE-BAND FREQUENCY LOCKED TO THE CAVITY

BACKGROUND OF INVENTION

1. Field of Invention

The present invention relates to a cavity enhanced absorption spectrometer and a method for controlling the same.

2. Description of Related Art

Cavity enhanced absorption spectroscopy (CEAS) is a linear optical absorption spectroscopy. It uses an optical resonator with very low optical loss (e.g. high finesse) to trap circulating optical radiation for many round trips, thus increasing the effective path length traveled by the radiation, typically by a factor of several thousand times the physical length of the resonator. This length enhancement factor also applies to the optical absorption sensitivity, making CEAS an extremely sensitive detection technique. Cavity ring-down spectroscopy (CRDS) is a common type of CEAS in which the optical injection is periodically interrupted, and the exponential ring-down of radiation exiting the CRDS resonator is measured.

CEAS requires injecting optical radiation into the resonator, such as from a laser, typically through one of the mirrors comprising the resonator. The CEAS resonator typically has discrete resonant modes defined by a unique spatial-temporal electromagnetic field profile within the resonator. Because the resonator modes have high finesse (low loss), the radiation spectral acceptance bandwidths of the modes are correspondingly very narrow, much more narrow than the spectral line width of most free-running lasers. Thus only a fraction of the laser power, namely the fraction within a CEAS resonator mode bandwidth (or within the bandwidths of several modes), is injected into the CEAS resonator, and the remaining laser power is wasted.

Also, it is known that the laser optical frequency and CEAS resonator mode resonant frequency quickly drift apart, if not actively controlled together. As a result of this property, many implementations of CEAS sweep the CEAS resonator length (thus sweeping the resonant frequencies of its modes), or the laser frequency, so that the two are momentarily coincident during the sweep, at which time some incident radiation from the laser can enter the CEAS resonator. Sweeping takes time and limits the duty cycle of the CEAS measurement.

To increase the efficiency of injection of the incident radiation into the CEAS resonator, and to avoid the need for sweeping, the frequency of the radiation and the resonance frequency of the CEAS resonator mode are often actively locked to each other. The most common technique of frequency locking is the Pound-Drever-Hall (PDH) technique, which provides a proximity signal (usually called an error signal) used to adjust the frequency of either the radiation source or the CEAS resonator mode to maintain coincidence with the other. Throughout the instant specification and in the appended claims, the terms "Pound-Drever-Hall technique", "PDH technique" and "technique of Pound-Drever-Hall" shall be understood to mean the technique described in R. W. P. Drever et al, "Laser phase and frequency stabilization using optical resonator," Appl. Phys. B 31, 97-105 (1983), and E. D. Black, "An introduction to Pound-Drever-Hall laser frequency stabilization," American Journal of Physics 69, 79-87 (2001), which are hereby incorporated by reference. In accordance with the Pound-Drever-Hall technique, the CEAS resonator mode frequency is usually adjusted by changing the resonator length with, e.g., a piezoelectric transducer (PZT).

The laser frequency is usually adjusted by changing its length (in the case of a gas laser or external cavity diode laser (ECDL)) or refractive index (e.g. by current injection in a diode laser or temperature change in a solid state or diode laser). Changing a physical length is relatively slow (bandwidth up to 1 kHz to 10 kHz) since it requires mechanical motion. Changing a refractive index by electronic means is usually fast (bandwidth up to 1 MHz to 1 GHz). Sometimes, the error signal is split into a low-frequency portion which is used to adjust a physical length (either the laser or the CEAS resonator), and a high-frequency portion which is used to adjust the refractive index of the laser.

In addition to CRDS, other forms of CEAS can also benefit from locking. Direct cavity transmission (DCT) spectroscopy and integrated cavity output spectroscopy (ICOS) (see, e.g., A. O'Keefe, J. J. Scherer, and J. B. Paul, "cw Integrated cavity output spectroscopy," Chemical Physics Letters 307, 343-349 (1999), which is hereby incorporated by reference in its entirety) involve the simple continuous measurement of the radiation intensity transmitted through an optical resonator. These techniques are similar to direct path absorption spectroscopy, the simplest optical spectroscopy, in which a beam of radiation is sent along a path with no resonator, and the transmitted optical power (normalized to incident power) is measured as a function of some parameter such as wavelength. In DCT and ICOS, however, radiation is transmitted only when the radiation is resonant with the optical cavity. As in CRDS, sweeping either the wavelength or the cavity length takes time and limits the duty cycle of the measurement. With locking, the duty cycle is potentially 100%.

To lock effectively, the response bandwidth of the adjustment must be at least as large as the bandwidth of the frequency difference fluctuation between the radiation source and the CEAS resonator mode. This fluctuation is typically dominated by laser frequency noise. In the case of solid-state lasers such as ECDLs, the laser frequency noise bandwidth is usually small compared with the adjustment bandwidth of the laser using injection current. The optical frequency of most distributed feedback (DFB) lasers, however, does not respond quickly to current injection (<1 MHz tuning bandwidth), and their noise bandwidths are often large (>1 MHz). Many other types of lasers lack any fast frequency tuning mechanism at all, such as (most) optically pumped lasers (e.g. Nd:YAG). As a result, there is no direct adjustment of either the CEAS resonator or the laser in the high-frequency range to maintain locking. This reduces the radiation injection efficiency and transient disturbance may cause total loss of lock, including at low frequency. Recovery requires a sweep (or equivalent) to reacquire the lock condition. The reduced injection efficiency reduces the CEAS signal magnitude (thus reducing signal-to-noise ratio), and transient loss of lock introduces gaps in the measurement time sequence. To provide effective locking at high frequency, a laser frequency tuning method other than laser current injection must be employed.

BRIEF SUMMARY OF THE INVENTION

In view of the foregoing, the present invention provides a cavity enhanced absorption spectrometer that comprises:
 a source for generating coherent electro-magnetic radiation having a frequency;
 an electro-magnetic modulator that creates an electro-magnetic radiation sideband with an adjustable frequency that is offset from the coherent electro-magnetic radiation source frequency by imparting an adjustable frequency modulation to the coherent electro-magnetic radiation;

a RF source that drives the electro-magnetic modulator;

a cavity enhanced absorption resonator that receives the electro-magnetic radiation sideband, the cavity enhanced absorption resonator having a resonant frequency;

a detector that measures the proximity of the frequency of the electro-magnetic radiation sideband relative to the resonant frequency of the cavity enhanced absorption resonator and generates a proximity detector signal; and a controller that converts the proximity detector signal to a control signal that controls at least one of the RF source and the resonant frequency of the cavity enhanced absorption resonator, whereby the frequency of the electro-magnetic radiation sideband and the resonant frequency of the cavity enhanced absorption resonator are adjusted to maintain a predetermined proximity therebetween.

The present invention also provides a method for controlling a cavity enhanced absorption spectrometer that comprises a source for generating coherent electro-magnetic radiation having a frequency, an electro-magnetic modulator, an RF source that drives the electro-magnetic modulator, and a cavity enhanced absorption resonator having a resonant frequency, the method comprising:

creating an electro-magnetic radiation sideband with an adjustable frequency that is offset from the coherent electro-magnetic radiation source frequency using the electro-magnetic modulator by imparting an adjustable frequency modulation to the coherent electro-magnetic radiation source;

injecting the electro-magnetic radiation sideband into the cavity enhanced absorption resonator;

detecting the proximity of the frequency of the electro-magnetic radiation sideband relative to the resonant frequency of the cavity enhanced absorption resonator; and controlling at least one of the RF source and the resonant frequency of the cavity enhanced absorption resonator, whereby the frequency of the electro-magnetic radiation sideband and the resonant frequency of the cavity enhanced absorption resonator are adjusted to maintain a predetermined proximity therebetween.

In this invention, the sideband is locked to the cavity enhanced absorption resonator instead of the unmodulated laser itself. The invention requires that the modulator, which generates the sideband, be capable of responding rapidly to the control signal. Thereby, the frequency of the sideband may be adjusted rapidly enough to maintain locking to the cavity enhanced absorption resonator. This invention is particularly useful if the laser frequency itself cannot respond rapidly enough to maintain locking, such as is normally the case with, for example, DFB lasers and Nd:YAG lasers. Previously, these lasers were typically not frequency locked to the cavity enhanced absorption resonator, and as a result, the duty cycle and noise of the cavity-enhanced measurements were inferior to measurements using apparatus incorporating the present invention.

The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

The theory of operation of sideband locking according to the invention is described below with reference to FIGS. 1A, 1B, 2A and 2B. The frequency of laser emission, $v_{laser}$, varies in time, as indicated by the solid curve in the graph of FIG. 1A. Rapid variation in the frequency of laser emission is often called "jitter" and slow variation is called "drift." The laser emission observed over a time long enough to see the variation has a non-trivial spectrum with a non-zero spectral linewidth, as indicated by the solid curve in the graph of FIG. 1B.

Figures 1A, 1B:
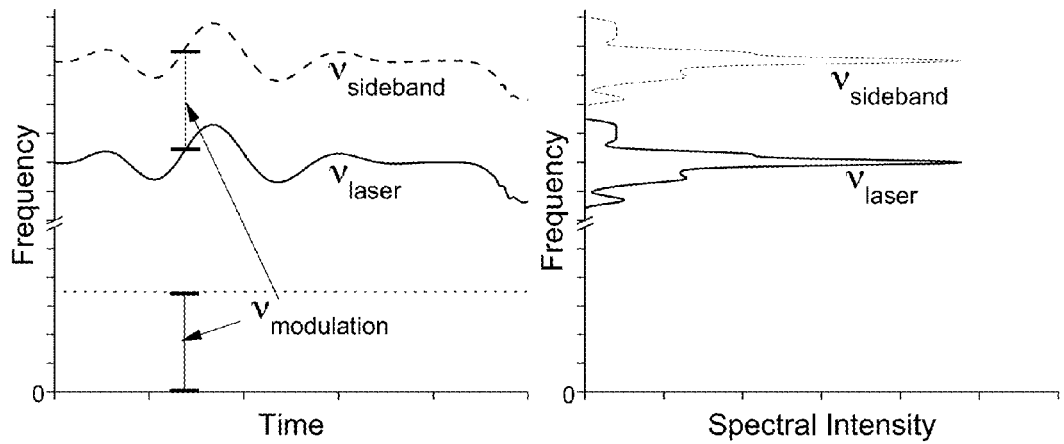
FIG. 1A is an exemplary graph showing varying frequency of laser emission as a function of time and a sideband arising from fixed frequency modulation.
FIG. 1B is an exemplary graph showing the corresponding spectral intensity of laser emission and the sideband as a function of optical frequency.
Figures 2A, 2B:
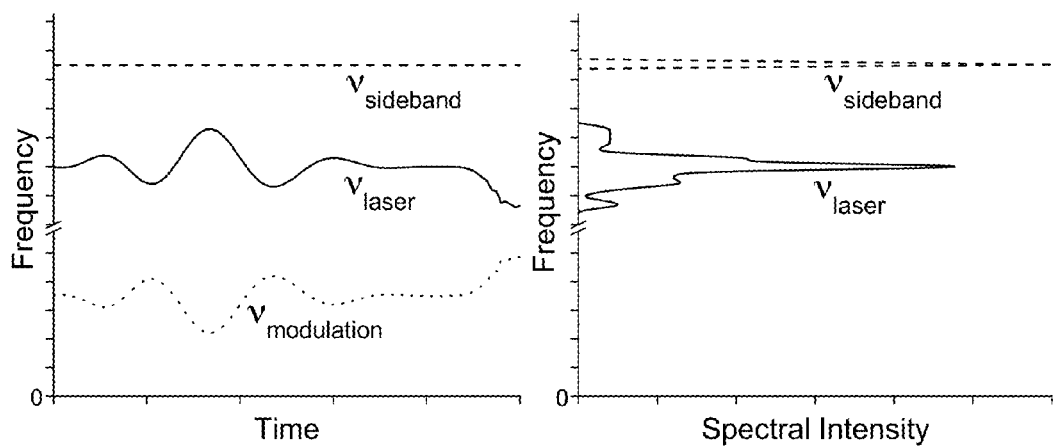
FIG. 2A is an exemplary graph showing varying frequency of laser emission as a function of time and a sideband arising from adjustable frequency modulation.
FIG. 2B is an exemplary graph showing the corresponding spectral intensity of laser emission and the sideband as a function of optical frequency.

Applying an external phase or frequency modulation with frequency $v_{modulation}$ creates sidebands at frequencies $v_{laser}+m^*v_{modulation}$, where m is one or more integers. If this modulation frequency is fixed, as indicated by the dotted curve in the graph of FIG. 1A, then each sideband is a duplicate of the original laser emission spectrum shifted by $m^*v_{modulation}$. In sideband locking CEAS according to the invention, the frequency injected into the CEAS resonator, $v_{sideband}$, is chosen from this set. One such sideband, $v_{sideband}$, is indicated by the dashed curve in the graph of FIG. 1A, and its spectrum is indicated by the dashed curve in the graph of FIG. 1B. The vertical bars in FIG. 1A both indicate the value of $v_{modulation}$, and show that this is the difference between $v_{sideband}$ and $v_{laser}$. Typically $v_{sideband}=v_{laser}+v_{modulation}$ is injected into the CEAS resonator, instead of the original laser frequency, and an injection frequency proximity (error) signal is measured indicating the difference between the CEAS resonant frequency and the injected laser frequency. This proximity signal is obtained, for example, using the PDH technique by imparting weak sidebands at $v_{sideband}\pm v_{PDH}$, where $v_{PDH}<v_{modulation}$. This proximity signal is used to adjust $v_{modulation}$ in real time to keep $v_{sideband}$ locked to the CEAS resonator frequency, thus forming a feedback control loop: if $v_{laser}$ has a frequency variation as a function of time, then $v_{modulation}$ will have equal but opposite frequency variation so that summing, which produces $\mu v_{sideband}$, cancels the variation. FIGS. 2A and 2B illustrate this cancellation. The graph of FIG. 2A shows the time dependence of the original $v_{laser}$ (solid curve), the now time-dependent modulation $v_{modulation}$ (dotted curve), and the resulting sideband $v_{sideband}$ (dashed curve). The graph of FIG. 2B shows the corresponding spectra of the original laser emission (solid curve, unchanged from FIG. 1A), and the sideband (dashed curve). Note that the time variation of $v_{modulation}$ is negative of the variation of $\nu_{laser}$, although their center frequencies are vastly different. With the sideband, $\nu_{sideband}$, locked to the resonator, its linewidth is significantly narrowed compared to the original emission at $\nu_{laser}$ (as shown in FIG. 2B).

The smallest achievable linewidth of $\nu_{sideband}$ is limited by the locking electronics, the length of optical path between the modulator and the CEAS resonator, and the linewidth of the CEAS resonator. It is ideally a small fraction of the CEAS resonator linewidth. In addition to the sideband $\nu_{laser}$+ $\nu_{modulation}$, any higher order sideband, $|m|>1$, may be employed instead. This may be convenient if the modulator bandwidth is limited. The error signal may be split into high-frequency and low-frequency components. The high-frequency component is then used to adjust $\nu_{sideband}$, while the low-frequency component is used to adjust the CEAS resonator length, e.g. with a PZT, or the laser by temperature tuning or length adjustment.

Figure 3:
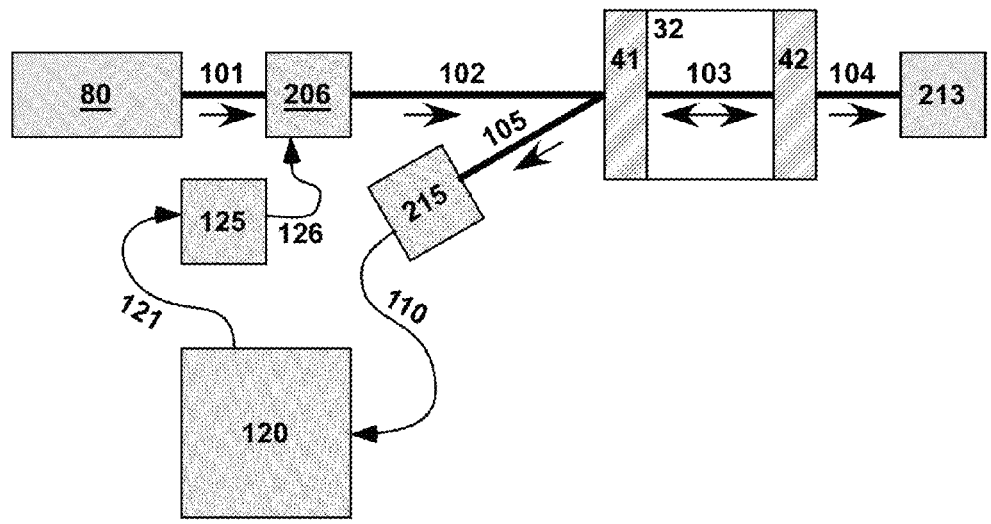
FIG. 3 is a schematic diagram that illustrates a manner in which an apparatus according to the invention can function.

FIG. 3 schematically illustrates an exemplary apparatus that employs a single laser and a single CEAS resonator, and the laser beam (thick straight lines) and electronic signals (thin curved lines) traveling between them. The arrows next to the laser beam segments indicate the direction of travel of the laser beam along that segment. Each curved line representing an electronic signal has an arrow indicating the direction of travel of the signal. The laser beam 101 is initially emitted from laser 80. The electro-optic modulator 206 creates a sideband of the beam 101, and the beam 102 comprising the sideband travels to the CEAS resonator 32 comprised of at least an input mirror 41 and an output mirror 42. The beam 103 circulates within the resonator 32, and a small fraction is emitted through the output mirror as beam 104, which impinges on the transmission detector 213 used to measure the ring-down signal. The beam 105 is a combination of the beam 102 directly reflected off the entrance mirror 41 of the CEAS resonator, and the fraction of beam 103 transmitted through the same mirror. Beam 105 impinges on lock detector 215. The beam 105 can be initially collinear (and opposite) with beam 102 and can be separated from it with a beam-splitter (see element 216 in FIG. 5), or a combination of quarter wave-plate and polarizing beam-splitter. The signal 110 from the lock detector 215 travels to the controller 120, which converts the signal 110 into a signal 121 to control the modulation frequency $\nu_{modulation}$ of modulator 206. Radio frequency (RF) generator 125 takes signal 121 as input and generates RF signal 126 of sufficient power to drive modulator 206. The RF generator typically consists of a voltage-controlled oscillator (VCO) which creates a low-power RF wave, followed by an RF amplifier.

Figure 4:
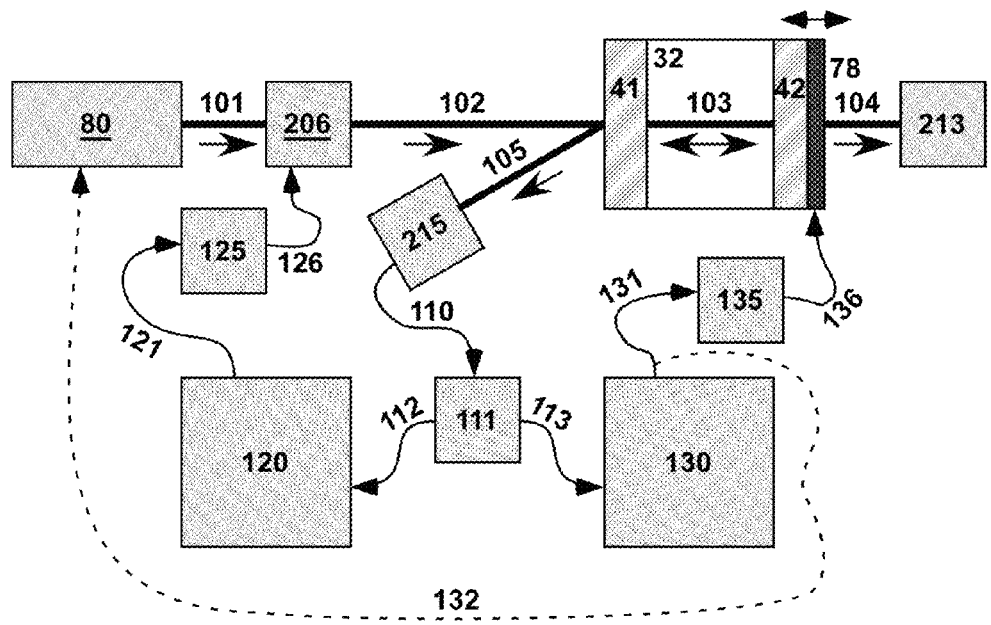
FIG. 4 is a schematic diagram that illustrates an alternative manner in which an apparatus according to the invention can function.

FIG. 4 schematically illustrates another exemplary apparatus, which is similar in some respects to that which is shown in FIG. 3. The laser beam and electronic signals are the same as represented as in FIG. 3. Frequency filter 111 splits the lock detector signal 110 into a high-frequency part 112 (e.g. resulting from the laser frequency jitter) and a low-frequency part 113 (e.g. resulting from the drift between the laser and CEAS resonator frequencies). The high-frequency part is used as input to controller 120 to control the modulator 206 modulation frequency $\nu_{modulation}$ via RF generator 125 as in FIG. 3. The low-frequency part is used as input to controller 130 which converts the signal 113 to signal 131 to control the resonant frequency of the CEAS resonator. Amplifier 135 takes signal 131 as input and generates signal 136 to drive CEAS resonator adjuster 78 to effect a change in the resonant frequency of the CEAS resonator. Amplifier 135 is typically a high-voltage amplifier, signal 136 is typically a high-voltage signal, and adjuster 78 is typically a position transducer such as a piezo-electric transducer onto which one of the CEAS resonator mirrors is attached. Alternatively to adjusting the resonator resonant frequency, the output 132 of controller 130 may be used to control the optical frequency of the laser 80. Using the low-frequency component of signal 110 to control the CEAS resonator resonant frequency or the laser frequency is often convenient to limit the required operating range of modulator frequency $\nu_{modulation}$. Frequency filter 111 often provides some small overlap of frequency range between signals 111 and 112.

Figure 5:
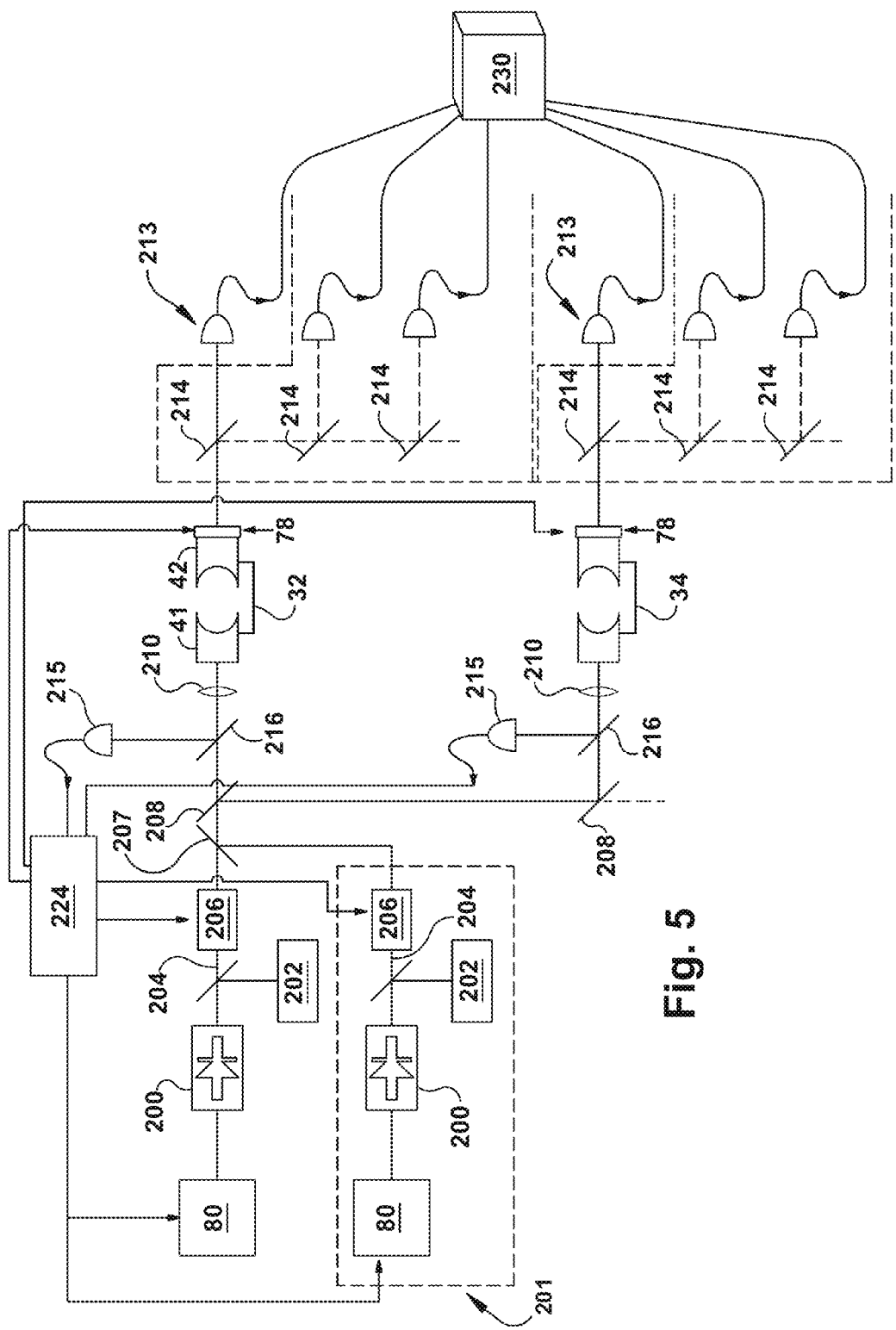
FIG. 5 is a schematic representation of optics and laser electronics used with an exemplary cavity enhanced absorption spectrometer according to the invention.

Referring to FIG. 5, a specific laser scheme to perform CRDS can be configured as follows: Light from the laser diode source 80 (e.g. a temperature stabilized DFB type laser) passes through an optical isolator 200. The wavelength of the laser may be chosen based on the properties of the species to be detected or may be selected based on a history of previous measurements. Optionally, a fraction of the light is sent to a wavelength reference 202 (e.g. vapor cell or other frequency reference). The reference is fed to the laser electronics that set the laser frequency to the desired frequency by varying the laser temperature and current. The fraction that does not pass into the wavelength reference (the majority of the light) passes into a single mode, polarization maintaining optical fiber or free-space beam 204. The fiber or free-space beam is coupled to a waveguide Electro-Optic (phase) Modulator (EOM) 206 chosen for wide bandwidth electro-optical response.

Figure 6:
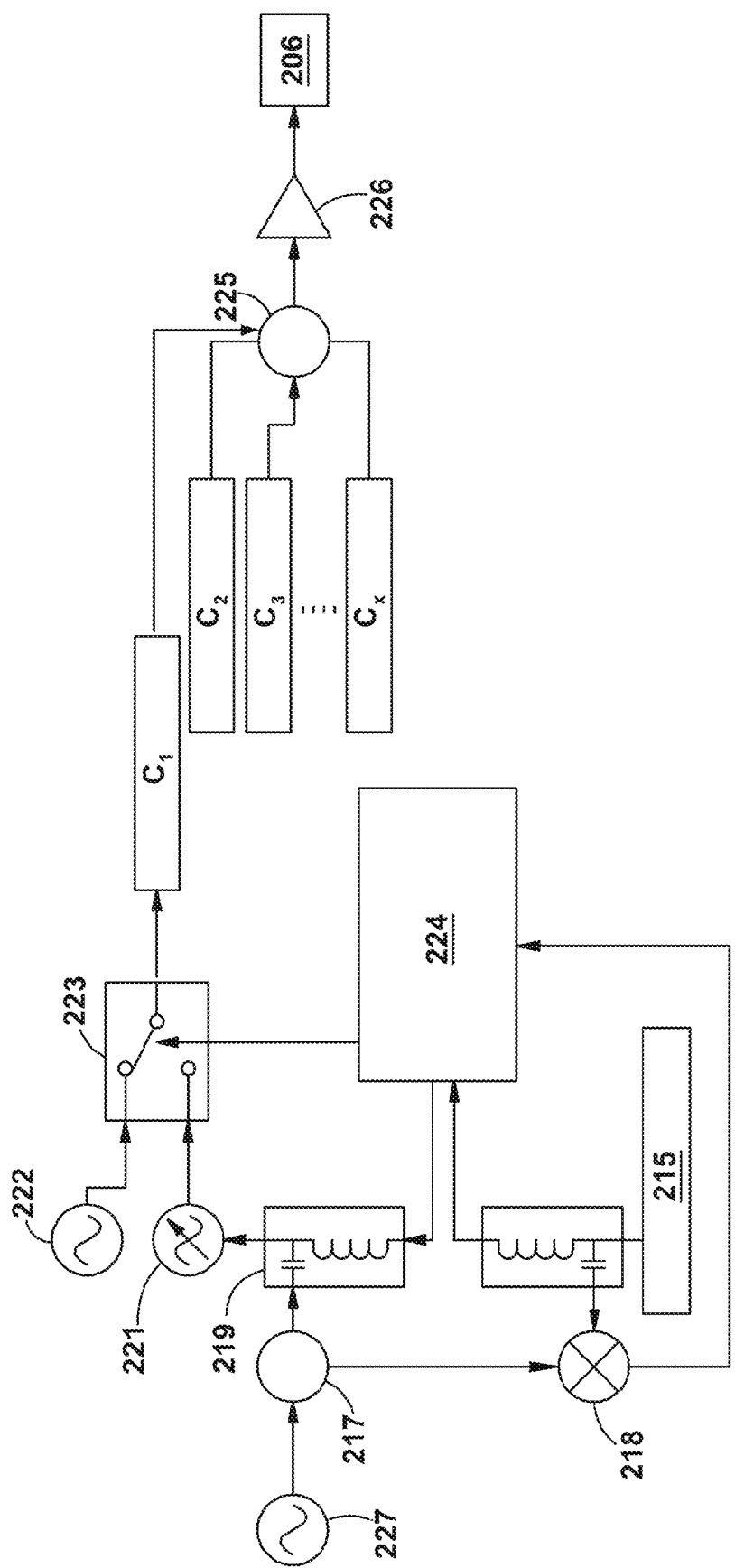
FIG. 6 is a schematic representation of radio frequency components for laser locking for the exemplary cavity enhanced absorption spectrometer illustrated in FIG. 5.

Referring to FIG. 6, the EOM 206 is driven with frequency modulated radio-frequency (RF) signals that allow locking of optical sidebands to an optical cavity. Conceptually, this approach is similar, in some respects, to prior art as described in R. Long, A. K. Tuchman, and M. A. Kasevich, "Multiple frequency modulation for low-light atom measurements in an optical cavity," Optics Letters 32, 2502-2504 (2007), but this prior art reference teaches the use of an acousto-optic modulator (AOM) instead of an EOM, which cannot respond quickly enough to compensate for the rapid frequency fluctuations of DFB and other laser sources (the jitter) as compared to this invention. By locking optical sidebands to the cavity instead of the optical carrier frequency (the unmodulated optical frequency emitted directly from the laser), the EOM 206 effects very fast feedback to the sideband frequency, facilitating laser locking. Locking the laser carrier frequency itself is often not feasible for the case of e.g. DFB lasers, because the laser frequency cannot be made to respond quickly enough to maintain frequency locking to the cavity. Use of the sideband enables the use of broad linewidth lasers with slow response that would otherwise be impossible to lock to the cavity. In addition, the EOM sideband lock greatly simplifies laser switching for ring-down initiation. A ring-down is initiated by turning off the RF drive for the particular sideband coupled to the cavity. Because of the wide bandwidth of the EOM 206, the switching can be extremely rapid, thereby avoiding complications in ring-down measurement due to slow switching of the light, and also facilitates reacquisition of the lock. Different cavities may be locked to different sidebands generated by driving the EOM 206 with multiple frequency modulated RF signals, or all cavities may be locked to the same sideband. When more than one cavity is employed, it is possible to alternate which cavity is ringing down so that each laser is constantly locked to at least one cavity. For these lock schemes, the EOM 206 is used for high-frequency stabilization of the laser, i.e. "linewidth narrowing," as illustrated in FIG. 2, and the PZT attached to the cavity is used to tune the length of the cavity to resonate the target optical frequency.

Referring back to FIG. 5, after the light exits the EOM 206, it is combined with light from any additional laser systems

201, each of which can have a separate isolator and EOM with associated RF electronics. The combining of lasers can, for example, be accomplished in free space using dichroic optics 207 to minimize power loss. This light is then divided among the several cavities 32, 34 using beamsplitters 208 of varying reflection/transmission ratios depending on the number of cavities and the desired distribution of optical power among them. The light passes through mode-matching optics (lenses) 210 to couple maximally to the TEM00 mode of each CRDS optical cavity 32, 34, or equivalent low-order transverse mode for non-free-space cavities such as fiber loops. Light reflected from the cavity 32, 34 bounces off a beam pickoff 216 and is detected using an amplified photodiode 215.

The laser frequency is locked to the resonance frequency of the CRDS optical cavity 32, 34 using the RF circuit shown in FIG. 6, which implements the technique of Pound-Drever-Hall. An oscillator 227 generates a radio frequency signal $v_{PDH}$ used in the technique with the proximity detector signal to generate a control signal for the modulator. The radio frequency signal is split into two components using a zero-degree splitter 217. This radio frequency signal is combined with the computer controlled servo 224 output with bias-T 219. The combined signal drives the control port of a Voltage Controlled Oscillator (VCO) 221. The output frequencies $v_{modulation}$, $v_{modulation} \pm VPDH$ of VCO 221 are fed into a Single Pole Double Throw (SPDT) radio frequency switch 223. The frequencies $v_{modulation} \pm v_{PDH}$ generate sidebands of the radiation that are used specifically in the Pound-Drever-Hall technique. Also fed into the RF switch is the output of a dummy oscillator 222 whose output frequency f3 is different from $v_{modulation} \pm v_{PDH}$ and $v_{modulation}$ and whose output level is the same as the output of VCO 221. Dummy oscillator 222 maintains constant RF power to the EOM 206 but does not couple light into any cavity; this eliminates thermal effects in the EOM caused by switching RF power levels incident on this device. The output of the RF switch 223, associated with a first circuit $C_1$ is combined with the outputs of other similar circuits $C_2, C_3 \ldots C_X$ in a combiner 225, which is coupled to an RF amplifier 226 for driving the EOM 206 (It is typical to use an amplifier before an electro-optic device since the device usually requires moderate RF power and the RF original source, the VCO 221 in this case, is usually lower power). One such circuit is used for each cavity/laser pair. The laser is stabilized to the cavity by mixing the output of the lock photodiode 215 with the one of the outputs of the splitter 217 on a radio frequency mixer 218. The output of the mixer is the error signal that is fed into the computer controlled servo 224 to produce the servo output that feeds into VCO 221 as described above. The photodiode 215 is the proximity detector and the servo 224 is the controller that converts the proximity detector signal to a control signal for the modulator. The mixer 218 can be considered part of either the proximity detector or the controller. The servo output controls the center frequency of the VCO ($v_{modulation}$) which then controls the frequency of the laser sideband ($v_{sideband}$) created by the EOM, keeping that sideband resonant with the cavity. Typically, the controller, including the servo 224, is a type of electronic low-pass active filter, which uses the proximity detector signal as input, and multiplying by some gain factor, to create the output signal. A simple electronic active filter consists of an operational amplifier, a resistor, and a capacitor. A ring-down event is initiated by switching the RF switch to the dummy RF, which switches the laser sideband out of resonance with the optical cavity. At low frequencies, the computer controlled servo 224 also tunes the length of the cavity using the PZT 78.

Referring back to FIG. 5, the light transmitted through a cavity 32, 34 is detected on a series of amplified photodiodes 213, with one photodiode for each laser wavelength. The different laser wavelengths are separated using dichroic optics 214 or dispersive optical element(s) such as a grating or prism. The detectors are used to record the cavity ring-down signal for each wavelength. The output signal is digitized and analyzed in software (in computer hardware 230) to determine the ring-down time $\tau$ using, for example, a nonlinear least squares algorithm.

Other coherent electro-magnetic (e.g. optical) radiation sources can serve in place of a true laser. Many such sources use a nonlinear wavelength conversion process of a laser output (or multiple laser outputs) to generate a wavelength not readily available from a true laser. These sources include: sum frequency generator (SFG), second harmonic generator (SHG), third harmonic generator (THG), etc., difference frequency generator (DFG), optical parametric generator (OPG), optical parametric oscillator (OPO), Raman frequency shifting device, four-wave mixing device (FWM). (It will be appreciated that in the event that such an optical nonlinear frequency-mixing device is used in place of a laser, the boxes appearing in FIGS. 3-5 identified with reference number 80 would denote an optical nonlinear frequency-mixing device as opposed to a laser.) In the cases of the sources using a nonlinear conversion process, the modulation (either to create the locking sideband or the PDH sidebands or both) may be applied to either the generated radiation or to one or more of the lasers used in the nonlinear conversion process. For example, two pump lasers are used in DFG and the conversion produces a radiation frequency equal to the difference of the frequencies of the two lasers. Modulation may be applied to the radiation at the difference frequency, or to either or both pump lasers instead. Modulation applied to a pump laser in DFG causes a modulation at the same frequency in the DFG radiation. Modulation applied to a pump laser in SHG results in modulation of the converted radiation at once and twice times the modulation frequency of the pump because of the property of the SHG process. Modulation applied to a pump laser in THG results in modulation of the converted radiation at once, twice, and three times the modulation frequency of the pump because of the property of the THG process.

In addition to the EOM, other methods and devices exist to create electro-magnetic (e.g. optical) sidebands, such as by electro-magnetic modulation (of which optical modulation is a type thereof). Related to electro-magnetic modulation are the acousto-optic modulator (AOM) and acousto-optic tunable filter (AOTF). The AOM and AOTF are very limited in comparison to the EOM in that their response bandwidth is much less than that of the EOM and they possess a large phase delay that limits servo bandwidths due slow acoustic propagation in the AOM modulation medium. Because of this, AOTF and AOM are generally inadequate to compensate the frequency fluctuations of the lasers which are the object of this invention. These devices also display slower switching times than are available with modern high-bandwidth EOMs.

A first experimentally verified implementation of the invention applied to CRDS uses the EOM with RF originating from the VCO to generate both the locked optical sideband and the PDH sidebands. This is the configuration shown in FIG. 5.

In a second experimentally verified implementation of the invention applied to CRDS, the laser is powered directly by an electrical current and the $v_{PDH}$ sinusoidal modulation is applied as an AC current component to the laser. The laser then outputs optical frequencies $v_{laser}$ and $v_{laser} \pm v_{PDH}$. The EOM of FIG. 5 generates the locked optical sideband and the PDH sidebands by adding $\nu_{modulation}$ to each of the frequencies output by the laser. The VCO generates the RF at the sideband frequency separation ($\nu_{modulation}$). The voltage control signal for the VCO includes only a DC offset component which generates $\nu_{modulation}$. Feedback and locking proceed as in the first example. This configuration is appropriate if the laser responds to current modulation at $\nu_{PDH}$ with sufficient frequency modulation of the laser radiation output.

As implemented in DCT and ICOS, locking the cavity to the laser wavelength will cause the cavity to track the wavelength as the laser wavelength is scanned to measure the absorption spectrum. The slow component of the error signal effects this tracking. Either the laser wavelength or the optical cavity length can be independently controlled and scanned across the wavelength range of interest. If the laser wavelength is controlled and scanned (e.g. by changing the temperature or electric current of a DFB laser, or a quasi-DC change of $\nu_{modulation}$), then the slow component of the error signal is applied to the optical cavity length. If the optical cavity length is controlled and scanned, then the slow component of the error signal is applied to the laser wavelength (e.g. by adjusting the temperature or electric current of a DFB laser, or a quasi-DC adjustment of $\nu_{modulation}$).

Any optical resonator that may be used for CRDS, ICOS, or DCT can be used with sideband locking. The resonator may be either a standing-wave resonator or travelling-wave (e.g. ring) resonator. Appropriate resonator types include: free-space consisting of two or more mirrors, total-internal-reflection, whispering gallery mode (microspheres, micro-toroids, bottles or bubbles), micro-resonators (waveguide micro-rings). Whispering gallery mode resonators consist of optically transparent material and the radiation is contained within the material by total internal reflection and travels around the equator of the material shape. Bottles and bubbles are typically formed by deforming an optical fiber, glass tube, or other cylinder so that a short segment approximates the region around the equator of an ellipsoid. Some bottles are formed instead by damaging the surface of the cylinder at specific locations so that only select resonator modes resonate with low loss.

Locking schemes other than PDH incorporating sideband locking are possible. Paldus et al., (see, e.g., U.S. Pat. No. 6,084,682) used a separate laser frequency for locking from that used for ring-down. This separate frequency was resonant with the crossed polarization in the CRDS resonator from the polarization used for the ring-down measurement. As such, the locking frequency did not need to be turned off during the ring-down measurement (it is blocked before the ring-down detector by a polarizer). An additional feedback loop tracked the frequency separation of the two resonant polarizations in the CRDS resonator and maintained equal separation of the two laser frequencies. This technique can use sideband locking by generating one sideband for each of the two required laser polarizations. Hansch-Couillaud locking (see, e.g., U.S. Pat. No. 4,451,923) uses polarization rotation within the optical resonator to generate an error signal. Throughout the instant specification and in the appended claims, the term "technique of Hansch-Couillaud" shall be understood to mean the technique described in T. W. Hansch and B. Couillaud, "Laser frequency stabilization by polarization spectroscopy of a reflecting reference cavity," Optics Communications 35, 441-444 (1980), incorporated by reference. Spatial mode interference (tilt) locking involves use of a transverse mode of the optical resonator other than the frequency-locked mode to generate an optical phase reference (in the beam reflected from the resonator input) instead of the PDH sidebands. The error signal is the difference in optical power measured by two adjacent photo-detectors (e.g. a split detector) observing the interference pattern of the spatial modes reflected from the resonator. Throughout the instant specification and in the appended claims, the term "technique of spatial mode interference" shall be understood to mean the technique described in D. A. Shaddock, M. B. Gray, and D. E. McClelland, "Frequency locking a laser to an optical cavity by use of spatial mode interference," Optics Letters 24, 1499-1501 (1999), incorporated by reference.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A cavity enhanced absorption spectrometer comprising:
   a source that generates coherent electro-magnetic radiation having a frequency;
   an electro-magnetic modulator that creates an electro-magnetic radiation sideband with an adjustable frequency that is offset from the frequency of the coherent electro-magnetic radiation by imparting an adjustable frequency modulation to the coherent electro-magnetic radiation;
   a RF source that drives the electro-magnetic modulator;
   a cavity enhanced absorption resonator that receives the electro-magnetic radiation sideband, the cavity enhanced absorption resonator having a resonant frequency;
   a detector that measures a proximity of the frequency of the electro-magnetic radiation sideband relative to the resonant frequency of the cavity enhanced absorption resonator and generates a proximity detector signal; and
   a controller that converts the proximity detector signal to a control signal that controls the RF source to drive the electro-magnetic modulator such that the adjustable frequency of the electro-magnetic radiation sideband is adjusted so as to maintain a predetermined proximity to the resonant frequency of the cavity enhanced absorption resonator.

2. The cavity enhanced absorption spectrometer according to claim 1, wherein the predetermined proximity is zero.

3. The cavity enhanced absorption spectrometer according to claim 1, wherein the predetermined proximity is a value greater than zero.

4. The cavity enhanced absorption spectrometer according to claim 1, wherein the cavity enhanced absorption resonator is a cavity ring-down spectroscopy resonator, an integrated cavity output spectroscopy resonator, or a direct cavity transmission resonator.

5. The cavity enhanced absorption spectrometer according to claim 1, wherein the cavity enhanced absorption resonator is either a standing-wave or a travelling-wave resonator.

6. The cavity enhanced absorption spectrometer according to claim 1, wherein the cavity enhanced absorption resonator is a free-space resonator consisting of two or more mirrors, a total-internal-reflection resonator, a fiber resonator, a whispering gallery mode resonator or a micro-resonator.

7. The cavity enhanced absorption spectrometer according to claim 6, wherein the whispering gallery mode resonator comprises a microsphere, a micro-toroid, or a bottle resonator.

8. The cavity enhanced absorption spectrometer according to claim 6, wherein the micro-resonator comprises a waveguide micro-ring.

9. The cavity enhanced absorption spectrometer according to claim 1, wherein the electro-magnetic modulator is an electro-optic modulator.

10. The cavity enhanced absorption spectrometer according to claim 1, wherein the coherent electro-magnetic radiation source is a laser or an optical nonlinear frequency-mixing device.

11. The cavity enhanced absorption spectrometer according to claim 10, wherein the optical nonlinear frequency-mixing device is an optical parametric oscillator, an optical parametric generator, a difference frequency generator, a sum frequency generator, a second harmonic generator, a third harmonic generator, a four-wave mixing device or a Raman wavelength shifting device.

12. The cavity enhanced absorption spectrometer according to claim 10, wherein the optical nonlinear frequency-mixing device uses as input an output of at least one coherent electro-magnetic radiation source and wherein the electro-magnetic modulator acts on the output of at least one of the at least one coherent electro-magnetic radiation sources.

13. The cavity enhanced absorption spectrometer according to claim 1, wherein the proximity detector uses a technique of Pound-Drever-Hall, Hansch-Couillaud, or spatial mode interference to measure the proximity of the frequency of the electro-magnetic radiation sideband relative to the resonant frequency of the cavity enhanced absorption resonator and generate the proximity detector signal.

14. The cavity enhanced absorption spectrometer according to claim 13 wherein additional sidebands, used in measuring the proximity of the frequency of the electro-magnetic radiation sideband relative to the resonant frequency of the cavity enhanced absorption resonator, are imparted by the electro-magnetic modulator.

15. The cavity enhanced absorption spectrometer according to claim 13 wherein additional sidebands, used in measuring the proximity of the frequency of the electro-magnetic radiation sideband relative to the resonant frequency of the cavity enhanced absorption resonator, are imparted by applying modulation to a laser radiation within or preceding an optical nonlinear conversion frequency-mixing device.

16. The cavity enhanced absorption spectrometer according to claim 13 wherein additional sidebands, used in measuring the proximity of the frequency of the electro-magnetic radiation sideband relative to the resonant frequency of the cavity enhanced absorption resonator, are imparted by applying electric current modulation to a laser within the coherent electro-magnetic radiation source.

17. The cavity enhanced absorption spectrometer according to claim 1, wherein a low-frequency component of the control signal is used to control the resonant frequency of the cavity enhanced absorption resonator.

18. The cavity enhanced absorption spectrometer according to claim 1, wherein a low-frequency component of the control signal is used to control an electro-magnetic frequency of a laser within the coherent electro-magnetic radiation source.

19. The cavity enhanced absorption spectrometer according to claim 1, wherein the electro-magnetic radiation sideband is a first-order sideband of the modulation.

20. The cavity enhanced absorption spectrometer according to claim 1, wherein the electro-magnetic radiation sideband is a high-order sideband of the modulation.

21. The cavity enhanced absorption spectrometer according to claim 1, wherein the resonant frequency of the cavity enhanced absorption resonator is adjustable, and the controller is configured to send a signal that controls adjustments of the resonant frequency of the cavity enhanced absorption resonator.

22. A method for controlling a cavity enhanced absorption spectrometer having a source that generates a coherent electro-magnetic radiation having a frequency, an electro-magnetic modulator, an RF source that drives the electro-magnetic modulator, and a cavity enhanced absorption resonator having a resonant frequency, the method comprising:
    creating an electro-magnetic radiation sideband with an adjustable frequency that is offset from the coherent electro-magnetic radiation source frequency using the electro-magnetic modulator by imparting an adjustable frequency modulation to the coherent electro-magnetic radiation;
    injecting the electro-magnetic radiation sideband into the cavity enhanced absorption resonator;
    detecting the proximity of the frequency of the electro-magnetic radiation sideband relative to the resonant frequency of the cavity enhanced absorption resonator; and
    controlling the RF source to drive the electro-magnetic modulator such that the adjustable frequency of the electro-magnetic radiation sideband is adjusted so as to maintain a predetermined proximity to the resonant frequency of the cavity enhanced absorption resonator.

23. The method according to claim 22, wherein the resonant frequency of the cavity enhanced absorption resonator is adjustable, and the controller is configured to send a signal that controls adjustments of the resonant frequency of the cavity enhanced absorption resonator.

* * * * *